United States Patent
Albright et al.

[15] 3,673,214
[45] June 27, 1972

[54] RING-E SUBSTITUTED 4-CYANO-3-SECOYOHIMBANES AND -CYANO-3-SECOALLOYOHIMBANES

[72] Inventors: Jay Donald Albright; Leon Goldman, both of Nanuet, N.Y.

[73] Assignee: American Cyanamid Company, Stamford, Conn.

[22] Filed: Jan. 11, 1971

[21] Appl. No.: 105,641

Related U.S. Application Data

[62] Division of Ser. No. 758,593, Sept. 9, 1968, Pat. No. 3,576,004.

[52] U.S. Cl. .................260/326.3, 260/287, 260/307 D, 260/326.5 B, 424/274

[51] Int. Cl. .................................................C07d 27/54
[58] Field of Search ...............................260/326.3, 326.5 B

[56] References Cited

UNITED STATES PATENTS 3,226,391  12/1965  Albright et al...................260/287

Primary Examiner—Alex Mazel
Assistant Examiner—Joseph A. Narcavage
Attorney—Edward A. Conroy, Jr.

[57] ABSTRACT

This disclosure describes compounds of the class of ring-E substituted 4-cyano-3-secoyohimbanes and 4-cyano-3-secoalloyohimbanes useful as analgesics, anti-inflammatory agents, and central nervous system depressants.

9 Claims, No Drawings

RING-E SUBSTITUTED 4-CYANO-3-SECOYOHIMBANES AND -CYANO-3-SECOALLOYOHIMBANES

CROSS REFERENCE TO RELATED APPLICATION

This application is a division of our copending application Ser. No. 758,593, filed Sept. 9, 1968, now U.S. Pat. No. 3,576,004.

BRIEF SUMMARY OF THE INVENTION

This invention relates to new organic compounds and, more particularly, is concerned with novel 4-cyano-3-secoyohimbanes and 4-cyano-3-secoalloyohimbanes which may be represented by the following structural formulas:

(I) 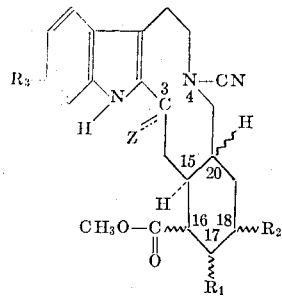

(II) 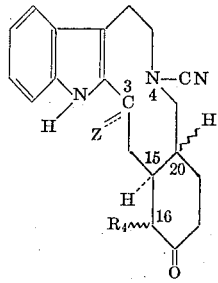

(III) 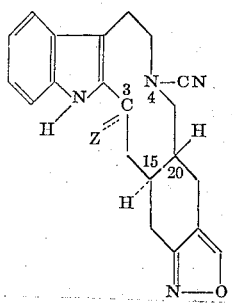

wherein C⩦Z is selected from the group consisting of C = O,

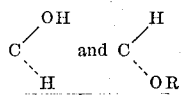

R is hydrogen or lower alkyl; $R_1$ is hydroxy, methoxy or methylthiomethoxy; $R_2$ is hydrogen, hydroxy, methylthiomethoxy or 3,4,5-trimethoxybenzoyloxy; $R_3$ is hydrogen or methoxy; and $R_4$ is hydrogen or carbomethoxy; with the proviso that when $R_1$ is hydroxy or methylthiomethoxy then $R_2$ is hydrogen, and with the further proviso that when $R_3$ is hydrogen then $R_2$ is hydrogen. Suitable lower alkyl groups contemplated by the present invention are those having up to six carbon atoms such as, for example, methyl, ethyl, isopropyl, n-propyl, isobutyl, sec.-butyl, tert.-amyl, n-hexyl, etc. In accordance with accepted convention, an α-substituent at the 3-, 15-, 16-, 17-, 18- and 20-positions is behind the plane of the paper whereas a β-substituent at these positions is in front of the plane of the paper. This is usually represented by a ---- bond for an α-substituent, a — bond for a β-substituent, and a ⁓ bond where both are indicated.

DETAILED DESCRIPTION OF THE INVENTION

The novel compounds of the present invention are, in general, white, tan or orange-brown crystalline solids (some being pale yellow non-crystalline glasses) having characteristic melting points and absorption spectra. The compounds are soluble in organic solvents such as lower alkanols, chloroform, acetone, N,N-dimethylformamide.

The novel compounds of the present invention may be readily prepared by reacting an appropriately ring-E substituted yohimbe alkaloid of the following general formulas:

(IV) 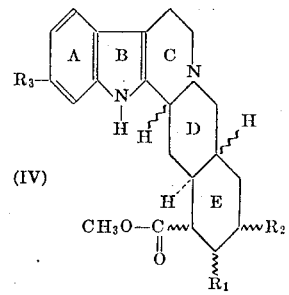

(V) 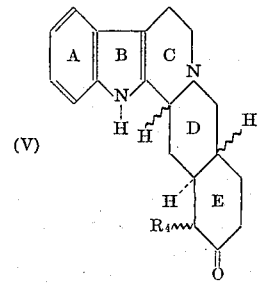

(VI) 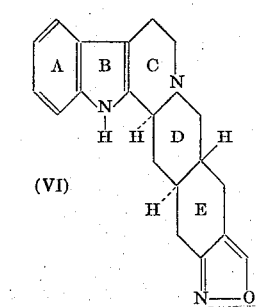

wherein $R_1$, $R_2$, $R_3$ and $R_4$ are as hereinabove defined, with cyanogen bromide under solvolytic conditions. These starting materials for the preparation of the novel compounds of the present invention are derivatives of yohimbane belonging to the normal, pseudo, allo and epiallo series depending upon the cis or trans fusion of the D and E rings and the configuration at the 3-positions. The preparation of these appropriately ring-E substituted yohimbe alkaloid starting materials may be found in the following references: Albright et al., J. Org. Chem. 28, 38 (1963): Albright et al., J. Org. Chem. 30, 1107 (1965); and Albright et al., J. Am. Chem. Soc. 89, 2416 (1967).

The reaction is an important modification of the classical von Braun reaction which involves reaction of a tertiary amine with cyanogen bromide in an inert solvent such as chloroform, benzene, and the like. In general, the standard von Braun reaction gives derivatives containing a bromine atom or olefinic materials. In contrast, we have found that in an aqueous or lower alkanolic medium, ring opening of compounds of structures (IV), (V) and (VI) occurs between N(b) of the β-carboline and C-3 to give 3-seco-4-cyano derivatives (I, II and III) with either a hydroxyl or a lower alkoxyl group at C-3, respectively. In the novel ring opening reaction with cyanogen bromide, compounds with an α-hydrogen atom at C-3, whether of the normal or allo series, give 3-seco cyanamide products which have a 6β-substituent at C-3. However, compounds with a β-hydrogen atom at C-3, whether of the normal or allo series, give mainly 3-seco products which have an α-substituent at C-3, along with some isomeric 3-seco derivatives with a β-substituent at C-3.

Preferably the ring opening reaction to produce 3-alkoxy-3-secocyanamide derivatives is carried out by reacting two moles of a yohimbane, pseudoyohimbane, alloyohimbane or epialloyohimbane derivative with one mole of cyanogen bromide in a mixture of excess lower alkanOl and a suitable organic solvent for 1 to 24 hours at 0° to 25° C. In this way one mole of a 3-seco derivative with a C-3 alkoxy group is obtained along with one mole of the hydrobromide salt of the starting alkaloid. Other solvents besides chloroform may be used. These include such inert diluents as benzene, tetrahydrofuran, dichloromethane, N,N-dimethylformamide, dioxane and the like. If preferred, the reacting alcohol may be used alone as both the solvent and reactant. Reactant alcohol mixed with an inert solvent has been found advantageous because of the increased solubility of the reacting alkaloid derivatives in a mixed medium. Complete solubility in the reaction medium is not required, however, for reactions have been carried out in which the main portion of the reacting alkaloid was not in solution at the start of the reaction.

An alternate procedure for the preparation of 3-seco derivatives with an alkoxy group at C–3 is to react one mole of a yohimbane, pseudoyohimbane, alloyohimbane or epialloyohimbane derivative with one mole of cyanogen bromide in the presence of an excess of an appropriate alcohol and one mole of a base such as diisopropylethylamine. The presence of a hindered tertiary amine such as diisopropylethylamine prevents the tying up of one-half of the starting alkaloid as the unreactive hydrobromide salt and allows complete conversion to a 3-seco derivative.

Preferably, likewise, for the preparation of 3-hydroxy-3-secocyanimide derivatives two moles of a yohimbane, pseudoyohimbane, alloyohimbane or epialloyohimbane derivative is reacted with one mole of cyanogen bromide in a mixture of tetrahydrofuran and excess water for 1 to 24 hours at 0° to 25° C. Other solvents besides tetrahydrofuran may be used. These include solvents miscible with water such as dioxane, N,N-dimethylformamide, etc. It has also been found that certain 3-hydroxy-3-seco derivatives can be converted into C-3 alkoxy derivatives. For example, methyl 4-cyano-3α,18β-dihydroxy-11,17α-dimethoxy-3-secoalloyohimbane-16β-carboxylate, on refluxing in ethanol, gives methyl 4-cyano-11,17α-dimethoxy-3α-ethoxy-18β-hydroxyalloyohimbane-16β-carboxylate. The reaction is believed to be acid catalyzed.

The preparation of the novel 3-oxo-3-secocyanimides of this invention is carried out by reaction of 3-hydroxy-3-seco-4-cyano yohimbanes or alloyohimbanes with lead tetraacetate in glacial acetic acid. The reaction may be carried out with inert solvents, such as chloroform, dichloromethane and the like, as diluents. Other oxidizing agents such as manganese dioxide may be used to convert the 3-hydroxy-3-seco-4-cyano derivatives to 3-oxo-3-seco-4-cyano compounds.

The novel compounds of the present invention are valuable central nervous system depressants of low toxicity and were shown to possess CNS depressant activity as determined by animal experiments as follows. The compounds were administered intraperitoneally to groups of five mice at a dose level of 50 mg./kg. of body weight. Then, 5 minute counts of motor activity for each group of mice are made by means of an actophotometer which is a photoelectric device consisting essentially of a circular cage holding six lights directed respectively at six photoelectric cells spaced evenly around the perimeter of the cage. A single count is recorded automatically each time a mouse breaks a light beam, and the total of such counts during a given interval is a measurement of the total motor activity of the mice in the actophotometer. Counts of 250 or less are considered to indicate a significant reduction (more than two standard deviations) of motor activity. Those compounds that appeared to reduce motor activity by 50 percent or more were administered to additional groups of five mice at graded doses and tested similarly. The motor depressant dose ($MDD_{50}$) which caused a 50 percent reduction in motor activity was then estimated from the dose response curve. In a representative operation, and merely by way of illustration, two typical compounds of this invention were shown to reduce locomotor activity as set forth in Table I below:

TABLE I

| Compound | $MDD_{50}$ in mg./kg. of body weight |
|---|---|
| 3β-hydroxy-17-oxo-3-secoyohimbane-4-carbonitrile | 29 |
| methyl 4-cyano-3α,18β-dihydroxy-11,17α-dimethoxy-3-secoalloyohimbane-16β-carboxylate | 35 |

The novel compounds of the present invention are active analgesics when measured by the "writhing syndrome" test for analgesic activity as described by Siegmund et al., Proc. Soc. Exptl. Biol. Med., Vol. 95, p. 729 (1957), with modifications. This method is based upon the reduction of the number of writhes following the intraperitoneal injection of 1 mg./kg. of body weight of phenyl-p-quinone in male Swiss Albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less. In a representative operation, methyl 4-cyano-3α-ethoxy-17α-hydroxy-3-secoyohimbane-16α-carboxylate, 3β-ethoxy-3-secoyohimbano[17,18-c]isoxazole and methyl 4-cyano-11,17α-dimethoxy-3β-ethoxy-18β-hydroxy-3-secoalloyohimbane-16β-carboxylate all showed analgesic activity when tested by this procedure at an oral dose of 25 mg./kg. of body weight. If desired, the median effective dose ($ED_{50}$) for any particular compound may be calculated from the results obtained by repeating this test in multiple groups of two mice each at each of several graded dose levels.

A supplementary procedure which generally indicates analgesic or anti-inflammatory activity is based on the reduction of carrageenin-produced edema in the rat paw. Weanling Sherman strain rats ranging in weight from 50–55 grams are used and fed standard laboratory diet ad libitum. Test compounds are administered to the rats by gavage (250 milligrams per kilogram of body weight in a volume of 1.7 milliliters of buffered aqueous starch) 1 hour prior to challenge with carrageenin. The challenge agent, carrageenin, is bought from Marine Colloids, 2 Edison Place, Springfield, New Jersey, and prepared as a sterile 1 percent suspension in 0.9 percent aqueous sodium chloride. A volume of 0.05 milliliter is injected using a 26-gauge needle into the plantar tissue of the right hind paw of treated and untreated rats. Measurements of the volumes of the carrageenin inflamed right (challenged) paw and left (unchallenged) paw are determined 4 hours subsequent to the carrageenin challenge. The method of determining paw volumes is carried out essentially as described by C. A. Winter et al., in Proc. Soc. Exptl. Biol. Med. 111: 544–547 (1962) using mercury immersion. The differences in volume between the two paws of each rat is considered to be the volume of the carrageenin-induced edema. The mean edema volume of eight control rats divided by the mean edema volume of two treated rats is calculated as the C/T efficacy ratio. A compound is considered active in this test of the mean C/T efficacy ratio of 2 consecutive tests is equal to, or greater than 1.43. By way of illustration, methyl 4-cyano-3β-ethoxy-17α-hydroxy-3-secoyohimbane-16α-carboxylate when tested by this procedure was found active with efficacy ratios (C/T) of 2.32 and 1.85.

Additionally, the novel compounds of the present invention are active anti-inflammatory agents when tested against yeast-induced pyrexia in rats as follows. To groups of three Sherman strain rats, weighing 55±5 grams each, are administered subcutaneously in the napes of the necks, 0.6 milliliters of a 40 percent suspension of dried yeast in distilled water. Each test compound is then administered orally at a dosage of 250 milligrams per kilogram in a 2 percent acacia vehicle at 17 hours post-challenge. Control rats are treated in a similar manner but are not given the test compounds. At nineteen hours post-challenge the rectal temperature of each rat is recorded. The averaged numerical temperature for each group is then appropriately inserted into the relationship of control rats minus treated rats, abbreviated C-T. The test is designed in three sequential states, so that an acceptable compound requires three testing stages although one, two or three stages may be required for rejection. Those test compounds are judged active in which the C-T value is above 0.44 at stage one, and the averaged C-T value of both runs is above 0.55 at stage two, and the averaged C-T value of three runs is above 0.61 at stage three, and at which latter point the compound is accepted as an active anti-pyretic agent. If at any stage the average of the C-T values is below the above mentioned critical values, the compound is rejected as being inactive. In a representative operation, and merely by way of illustration, methyl 4-cyano-3β-ethoxy-17α-hydroxy-3-secoyohimbane-16α-carboxylate was active when measured in the above test.

The invention will be described in greater detail in conjunction with the following specific examples.

EXAMPLE 1

Preparation of methyl 4-cyano-3β-ethoxy-17-oxo-3-secoyohimbane-16α-carboxylate

To a suspension of 5.88 g. of yohimbinone in 150 ml. of chloroform and 75 ml. of ethanol was added 0.80 g. of cyanogen bromide and the mixture was stirred vigorously for 16 hours. The mixture was filtered, the precipitate was washed with chloroform and the combined filtrate and washings were concentrated under reduced pressure to a yellow glass. Trituration with ethyl acetate-ether (7:3) and filtration removed a small amount of precipitate. The filtrate, on concentration, gave 3.1 g. of a yellow glass. Purification by chromatography gave methyl 4-cyano-3β-ethoxy-17-oxo-3-secoyohimbane-16 α-carboxylate as an off-white glass.

EXAMPLE 2

Preparation of methyl 4-cyano-3β-ethoxy-17α-hydroxy-3-secoyohimbane-16α-carboxylate To a chilled solution of 14.2 g. of yohimbane in 100 ml. of ethanol and 100 ml. of chloroform was added a solution of 2.33 g. of cyanogen bromide in 35 ml. of ethanol. The mixture was allowed to warm to room temperature and was stirred for 20 hours. The precipitate of yohimbane hydrobromide was filtered off and washed with chloroform and the combined filtrate and wash was concentrated under reduced pressure to a yellow glass. This was triturated with acetone and the suspension was filtered and the filtrate was concentrated under reduced pressure to a glass. The glass was triturated with ethyl acetate and the suspension was filtered and the filtrate was concentrated under reduced pressure to yield 8.0 g. of methyl 4-cyano-3β-ethoxy-17α-hydroxy-3-secoyohimbane-16α-carboxylate as a yellow glass.

EXAMPLE 3

Preparation of methyl 4-cyano-3β-ethoxy-17-oxo-3-secoyohimbane-16α-carboxylate

A solution of 1.0 g. of methyl 4-cyano-3β-ethoxy-17α-hydroxy-3-secoyohimbane-16α-carboxylate in 10 ml. of dimethyl sulfoxide and 5 ml. of acetic anhydride was allowed to stand at room temperature for 18.5 hours. The solution was poured onto ice and the mixture was brought to pH 6.5–7 with ammonium hydroxide. The mixture was extracted with chloroform and the chloroform extract was dried over magnesium sulfate. Concentration of the extract under reduced pressure gave a gum which was partitioned between ether and water. The ether layer was washed with water, dried over magnesium sulfate and concentrated under reduced pressure to give 0.83 g. of a yellow glass. Purification by chromatography over silica gel with dichloromethane as eluant gave methyl 4-cyano-3β-ethoxy-17-oxo-3-secoyohimbane-16α-carboxylate as an off-white glass.

EXAMPLE 4

Preparation of methyl 4-cyano-3α-ethoxy-17α-hydroxy-3-secoyohimbane-16α-carboxylate To a suspension of 1.42 g. of pseudoyohimbine in 5 ml. of ethanol and 10 ml. of chloroform was added 0.212 g. of cyanogen bromide. The mixture was stirred vigorously for 18 hours and filtered to remove the precipitate of pseudoyohimbine hydrobromide. The filtrate was concentrated under reduced pressure to a glass. This was taken up in methanol, filtered to remove a precipitate, and the filtrate was concentrated to residue. This was dissolved in acetone, filtered to remove a precipitate, and the filtrate was concentrated. Filtration gave 0.20 g. of methyl 4-cyano-3α-ethoxy-17α-hydroxy-3-secoyohimbane-16α-carboxylate as white crystals, m.p. 174°–176° C.

The reaction was repeated as above and the reaction mixture, after removal of pseudoyohimbine hydrobromide by filtration, was concentrated under reduced pressure to yield a glass. This was crystallized from acetone to yield 0.50 g. of product as white crystals, m.p. 170°–174° C.

EXAMPLE 5

Preparation of 3β-ethoxy-17-oxo-3-secoyohimbane-4-carbonitrile

To a chilled mixture of 11.76 g. of 17-yohimbanone in 200 ml. of chloroform and 100 ml. of ethanol was added a solution of 2.33 g. of cyanogen bromide in 25 ml. of ethanol. The mixture was allowed to warm to room temperature and was stirred for 18.5 hours. The precipitate of 17-yohimbanone hydrobromide was removed by filtration and washed with chloroform and the combined filtrate and wash was concentrated under reduced pressure to a yellow solid. Trituration of the solid with methanol and filtration gave 7.0 g. of 3β-ethoxy-17-oxo-3-secoyohimbane-4-carbonitrile as light tan crystals, m.p. 263°–266° C. (dec.). Recrystallization from ethanol gave 4.0 g. of product as light tan crystals, m.p. 290°–292° C. (dec.).

EXAMPLE 6

Preparation of 3β-ethoxy-17-oxo-3-secoyohimbane-4-carbonitrile

To a solution of 1.18 g. of 17-yohimbanone in 25 ml. of chloroform and 10 ml. of ethanol was added 0.645 g. of diisopropylethylamine. To the stirred solution was added 0.466 g. of cyanogen bromide. The mixture was allowed to stand at room temperature for 17 hours, and was then concentrated under reduced pressure to near dryness. To the residue 50 ml. of water was added. The mixture was filtered to yield, after washing with water, 1.40 g. of tan crystals, m.p. 235°–240° C. Recrystallization from ethanol gave 1.05 g. of 3β-ethoxy-17-oxo-3-secoyohimbane-4-carbonitrile as tan crystals, m.p. 278°–281° C. (dec.)

EXAMPLE 7

Preparation of 3β-hydroxy-17-oxo-3-secoyohimbane-4-carbonitrile

To a chilled suspension of 11.76 g. of 17-yohimbanone in 400 ml. of tetrahydrofuran and 100 ml. of water was added 2.12 g. of cyanogen bromide. The mixture was allowed to warm to room temperature and was stirred for 16 hours. The mixture was filtered to remove the precipitate of 17-yohimbanone hydrobromide and the filtrate was concentrated under reduced pressure to a volume of about 50 ml. The mixture was diluted with water and the suspension was filtered to yield, after washing with water, 7.00 g. of tan crystals, m.p. 246°–252° C. (dec.). This was taken up in 650 ml. of hot chloroform-ethanol (1:1), filtered hot, and the filtrate was chilled and filtered to yield 3.50 g. of off-white crystals. Recrystallization from a mixture of dimethyl sulfoxide, acetone and water gave 2.13 g. of 3$\beta$-hydroxy-17-oxo-3-secoyohimbane-4-carbonitrile as off-white crystals, m.p. 271°–273° C. (dec.).

The reaction was repeated as above and the reaction mixture, after removal of the precipitate of 17-yohimbanone hydrobromide, was concentrated under reduced pressure to about 125 ml. The solution was diluted with 500 ml. of water and the crystals which formed were removed by filtration and washed with water. The yield of tan crystals of 3$\beta$-hydroxy-17-oxo-3-secoyohimbane-4-carbonitrile was 6.37 g.

EXAMPLE 8

Preparation of 3,17-dioxo-3-secoyohimbane-4-carbonitrile

To a suspension of 6.07 g. of 3$\beta$-hydroxy-17-oxo-3-secoyohimbane-4-carbonitrile in 220 ml. of glacial acetic acid was added 7.98 g. of lead tetraacetate. The mixture was stirred vigorously under nitrogen for 30 minutes, filtered and the filtrate was poured onto a mixture of ice and water. Dilution with cold water to a volume of 2 liters and filtering gave a solid. This was washed thoroughly with water and dried at 50° C. to give 3.60 g. of fine tan crystals, m.p. 218°–222° C. (dec.). Chilling the filtrate overnight gave an additional 0.80 g. of product, m.p. 190°–195° C. The two crops were combined and dissolved in acetone-chloroform (1:1). The solution was treated with activated carbon, filtered and the filtrate was concentrated under reduced pressure until substantial crystallization occurred. Chilling and filtering gave 2.50 g. of 3,17-dioxo-3-secoyohimbane-4-carbonitrile as tan crystals, m.p. 224°–226° C.

EXAMPLE 9

Preparation of methyl 4-cyano-3$\beta$,17$\alpha$-dihydroxy-3-secoyohimbane-16$\alpha$-carboxylate To a chilled solution of 14.18 g. of yohimbine in 250 ml. of tetrahydrofuran and 100 ml. of water was added 2.12 g. of cyanogen bromide. The mixture was allowed to stand at room temperature for 20 hours and was then concentrated to remove the tetrahydrofuran. The aqueous mixture was diluted with water and extracted with chloroform. The chloroform extract was dried over magnesium sulfate and concentrated under reduced pressure to give 9.0 g. of a pale yellow glass. The glass (5.0 g.) was chromatographed over 200 g. of aluminum oxide (activity III). Elution with chloroform-methanol (99:1) gave, after evaporation, 2.3 g. of methyl 4-cyano-3$\beta$,17$\alpha$-dihydroxy-3-secoyohimbane-16$\alpha$-carboxylate as a pale yellow glass, m.p. changes to gum above a 140° C., gum liquifies at 210°–225° C.

In a similar run, there was obtained 8.0 g. of product as a pale yellow glass. Chromatography over 500 g. of aluminum oxide (activity III) gave, on elution with chloroform-methanol (99:1), 6.4 g. of methyl 4-cyano-3$\beta$,17$\alpha$-dihydroxy-3-secoyohimbane-16$\alpha$-carboxylate as a yellow glass.

EXAMPLE 10

Preparation of methyl 4-cyano-3$\beta$,17$\alpha$-dihydroxy-3-secoyohimbane-16$\alpha$-carboxylate and methyl 4-cyano-3$\beta$,17$\alpha$-dihydroxy-3-secoyohimbane-16$\alpha$-carboxylate To a suspension of 1.42 g. of pseudoyohimbine in 22 ml. of tetrahydrofuran, 5 ml. of water and 5 ml. of acetone was added 0.212 g. of cyanogen bromide. The solid dissolved in 5–10 minutes and the solution was allowed to stand at room temperature for 20 hours. The solvent was removed under reduced pressure until a gum separated, water and chloroform were added and the crystals of pseudoyohimbine hydrobromide were removed by filtration. The chloroform layer of the filtrate was separated, dried over magnesium sulfate and concentrated under reduced pressure to a tan glass. The glass was chromatographed over 50 g. of neutral aluminum oxide (activity III) in chloroform-methanol (99.75:0.25). The center cut of the first peak gave 0.170 g. of white crystals which were recrystallized from acetone to give 0.085 g. of methyl 4-cyano-3$\alpha$,17$\alpha$-dihydroxy-3-secoyohimbane-16$\alpha$-carboxylate as white crystals, m.p. changes to a viscous mass at 150°–160° C. An additional 0.110 g. of product as white crystals was obtained from the fractions preceeding the center cut. Further elution of the column gave 0.085 g. of methyl 4-cyano-3$\beta$,17$\alpha$-dihydroxy-3-secoyohimbane-16$\alpha$-carboxylate as a pale yellow glass.

EXAMPLE 11

Preparation of methyl 4-cyano-17$\alpha$-hydroxy-3-oxo-3-secoyohimbane-16$\alpha$-carboxylate To a suspension of 1.58 g. of methyl 4-cyano-3$\beta$,17$\alpha$-dihydroxy-3-secoyohimbane-16$\alpha$-carboxylate in 5 ml. of glacial acetic acid and 5 ml. of dichloromethane was added 1.77 g. of lead tetraacetate. The mixture was stirred vigorously for 20 minutes and the solvent was removed under reduced pressure. The gummy residue was triturated with water and filtered and the pale yellow precipitate was washed thoroughly with water. Partition chromatography of the solid (1.1 g.) over 600 g. of diatomaceous earth with heptane-ethyl acetate-methanol-water (50:50:15:6) as solvent [hold back volume (HBV) of 850 ml.] gave 0.227 g. of impure product in HBV 2.0–2.5. Recrystallization from ethyl acetate gave 0.087 g. of methyl 4-cyano-17$\alpha$-hydroxy-3-oxo-3-secoyohimbane-16$\alpha$-carboxylate as white needles, m.p. 268°–270° C.

EXAMPLE 12

Preparation of methyl 4-cyano-17$\alpha$-hydroxy-3-oxo-3-secoyohimbane-16$\alpha$-carboxylate To a mixture of 3.54 g. of lead tetraacetate in 10 ml. of glacial acetic acid and 10 ml. of dichloromethane was added, in three portions, 3.16 g. of methyl 4-cyano-3$\beta$,17$\alpha$-dihydroxy-3-secoyohimbane-16$\alpha$-carboxylate. The mixture was chilled briefly, allowed to stand for 15 minutes and the solvent was removed under reduced pressure. The gummy residue was triturated with 200 ml. of cold water and filtered and the precipitate was washed thoroughly with water. Purification gave methyl 4-cyano-17$\alpha$-hydroxy-3-oxo-3-secoyohimbane-16$\alpha$-carboxylate as white needles, m.p. 268°–270° C.

EXAMPLE 13

Preparation of methyl 4-cyano-3$\beta$-ethoxy-17$\alpha$-(methylthiomethoxy)-3-secoyohimban-16$\alpha$-carboxylate To a solution of 1.24 g. of methyl 17$\alpha$-(methylthiomethoxy)yohimban-16$\alpha$-carboxylate in 10 ml. of ethanol and 10 ml. of chloroform was added 0.159 g. of cyanogen bromide. After 22 hours at room temperature the mixture was filtered and the precipitate was washed with chloroform. The combined filtrate and wash was concentrated under reduced pressure to give a yellow solid which was triturated with methanol. The resulting yellow crystals were filtered off and the filtrate was concentrated under reduced pressure to a glass. The glass was dissolved in chloroform and chromatographed over silica gel. Elution with chloroform-methanol (99:1) (25 ml. cuts) gave, from cut six, 0.11 g. of methyl 4-cyano-3$\beta$-ethoxy-17$\alpha$-(methylthiomethoxy)-3-secoyohimbane-16$\alpha$-carboxylate as a yellow glass, m.p. changes to a viscous mass at 95°–110° C.

EXAMPLE 14

Preparation of 4-cyano-3$\beta$-ethoxy-3-secoyohimbano[17,18-c]isoxazole

To a solution of 6.39 g. of yohimbano[17,18-c]isoxazole in 100 ml. of chloroform and 50 ml. of ethanol was added 2.84 g. of diisopropylethylamine and 2.12 g. of cyanogen bromide. The mixture was allowed to stand at room temperature for 17 hours and was concentrated to near dryness under reduced pressure. The residue, containing gummy material, was diluted with water and the brown solid which separated was removed by filtration and washed with water. Air drying gave 8.00 g. of product. Crystallization from ethyl acetate with the aid of activated carbon gave 1.80 g. of orange-brown crystals which were triturated with methanol and filtered to give 1.30 g. of orange-brown crystals, m.p. 205°–210° C. An additional 1.20 g. of crystals, m.p. 190°–195° C., was obtained from the methanol filtrate. Recrystallization of the combined crops from ethanol gave 1.35 g. of 4-cyanO-3β-ethoxy-3-secoyohimbano[17,18]isoxazole as orange-brown crystals, m.p. 208°–211° C.

EXAMPLE 15

Preparation of methyl 4-cyano-3α-ethoxy-18β-hydroxy-11,17α-dimethoxy-3-secoalloyohimbane-16β-carboxylate O-3,4,5-trimethoxybenzoate To a solution of 12.16 g. of reserpine in 100 ml. of chloroform and 100 ml. of ethanol was added 1.06 g. of cyanogen bromide. The solution was allowed to stand at room temperature for 17 hours and the solvent was removed under reduced pressure to give a yellow solid. The solid was triturated with water, filtered, and washed thoroughly with water. The dried solid was washed with portions of acetone (total 160 ml.) and the solution was concentrated to about 60 ml. Chilling and filtering gave 2.64 g. of product as white crystals, m.p. sinters and slowly melts above 155° C. The original solid was extracted again with three 100 ml. portions of acetone and the combined extracts were concentrated to a glass. Trituration with methanOl gave 1.20 g. of product as pale yellow crystals, m.p. sinters and slowly melts above 150° C. The combined crops of product were recrystallized from ethanol to give 3.16 g. of methyl 4-cyano-3α-ethoxy-18β-hydroxy-11,17α-dimethoxy-3-secoalloyohimbane-16β-carboxylate O-3,4,5-trimethoxybenzoate as white crystals, m.p., sinters and slowly melts above 155° C.

EXAMPLE 16

Preparation of methyl 4-cyano-11,17α-dimethoxy-3α-ethoxy-18β-hydroxy-3-secoalloyohimbane-16β-carboxylate To a chilled solution of 12.43 g. of methyl reserpate in 100 ml. of ethanol and 100 ml. of chloroform was added 1.59 g. of cyanogen bromide. The mixture was allowed to warm to room temperature and to stand for 17 hours. The solution was concentrated under reduced pressure to a glass. Trituration with water, filtration, and washing with water gave crystals. The crystals were dissolved in chloroform and the solution was washed with water, dried over magnesium sulfate and concentrated to a light tan solid. Trituration with methanol and filtration gave 5.10 g. of methyl 4-cyano-11,17α-dimethoxy-3α-ethoxy-18β-hydroxy-3-secoalloyohimbane-16β-carboxylate as white crystals, m.p. 258°–260° C.

EXAMPLE 17

Preparation of methyl 4-cyano-11,17α-dimethoxy-3β-ethoxy-18β-hydroxy-3-secoalloyohimbane-16β-carboxylate A solution of 41.4 mg. of methyl 3-isoreserpate and 5.3 m. of cyanogen bromide in 1 ml. of ethanol and 1 ml. of chloroform was allowed to stand at room temperature for 20 hours. The solvent was removed under reduced pressure and the residue was triturated with water and filtered to give 20 mg. of tan crystals. Recrystallization from methanol gave 5.5 mg. of methyl 4-cyano-11,17α-dimethoxy-3β-ethoxy-18β-hydroxy-3-secoalloyohimbane-16β-carboxylate as off-white needles, m.p. 264°–267° C.

EXAMPLE 18

Preparation of methyl 4-cyano-3α,18β-dihydroxy-11,17α-dimethoxy-3-secoalloyohimbane-16β-carboxylate To a solution of 12.43 g. of methyl reserpate in 200 ml. of tetrahydrofuran and 75 ml. of water was added 1.59 g. of cyanogen bromide. The mixture was allowed to stand at room temperature for 18 hours. The solution was concentrated to remove the tetrahydrofuran and was diluted with water. The resulting gummy mixture was extracted with chloroform and with chloroform-ethanol (4:1). The extracts (without drying) were concentrated under reduced pressure, and the residue was dissolved in acetone. Removal of the solvent under reduced pressure gave 11.8 g. of a yellow-orange glass. The glass was crystallized from chloroform to give 4.80 g. of product. Recrystallization from chloroform gave 3.70 g. of methyl 4-cyano-3α,18β-dihydroxy-11,17α-dimethoxy-3-secoalloyohimbane-16β-carboxylate as pale yellow crystals, m.p. sinters to a glass above 155° C. and slowly melts.

EXAMPLE 19

Preparation of methyl 4-cyano-11,17α-dimethoxy-3α-ethoxy-18β-hydroxy-3-secoalloyohimbane-16β-carboxylate and methyl 4-cyano-11,17α-dimethoxy-3β-ethoxy-18β-hydroxy-3-secoalloyohimbane-16β-carboxylate To a solution of 12.43 g. of methyl reserpate in 200 ml. of tetrahydrofuran and 75 ml. of water was added 1.59 g. of cyanogen bromide. The solution was chilled briefly and allowed to stand at room temperature for 23 hours. The mixture was concentrated to near dryness under reduced pressure. Ethanol was added and the solvent was removed under reduced pressure. The residue was partitioned between water and chloroform-ethanol (9:1). The organic extract was dried over magnesium sulfate and concentrated under reduced pressure to give 12.4 g. of a glass. The glass was dissolved in chloroform-acetone (1:1) and filtered through a column of magnesium silicate. The column was washed with 2.5 liters of chloroform-acetone (1:1) and with 1.5 liters of chloroform-methanol (4:1). The combined washings were concentrated to give 6.50 g. of glass. Chromatography over 200 g. of neutral aluminum oxide (activity III) gave, on elution with chloroform-methanol (99:1), 2.65 g. of a 1:1 mixture of methyl 4-cyano-11,17α-dimethoxy-3α-ethoxy-18β-hydroxy-3-secoyohimbane-16β-carboxylate and methyl 4-cyano-11,17α-dimethoxy-3β-ethoxy-18β-hydroxy-3-secoalloyohimbane-16β-carboxylate as a yellow glass. Crystallization from methanol gave 0.90 g. of white crystals, m.p. 235°–238° C. Recrystallization from methanol gave 0.31 g. of methyl 4-cyano-11,17α-dimethoxy-3β-ethoxy-18β-hydroxy-3-secoalloyohimbane-16β-carboxylate as white crystals, m.p. 270°–272° C.

In a similar run the product was extracted with chloroform containing 0.75 percent ethanol. Concentration of the chloroform extracts gave a yellow glass. Chromatography of 6.88 g. of the glass over 200 g. of neutral aluminum oxide (activity III) and elution (100 ml. cuts) with chloroform-ethanol (99.75:0.75) gave, after crystallization from methanol, 0.45 g. of methyl 4-cyano-11,17α-dimethoxy-3β-ethoxy-18β-hydroxy-3-secoalloyohimbane-16β-carboxylate as white needles, m.p. 272°–275° C.

EXAMPLE 20

Preparation of methyl 4-cyano-11,17α-dimethoxy-3α-ethoxy-18β-hydroxy-3-secoalloyohimbane-16β-carboxylate A solution of 0.100 g. of methyl 4-cyano-3α,18β-dihydroxy-11,17α-dimethoxy-3-secoalloyohimbane-16β-carboxylate in 10 ml. of absolute ethanol was refluxed for 4 hours. The solvent was removed under reduced pressure and the residual glass was triturated with methanol to give crystals. Filtration gave methyl 4-cyano-11,17α-dimethoxy-3α-ethoxy-18β-hydroxy-3-secoalloyohimbane-16β-carboxylate as off-white crystals, m.p. 254°–258° C.

EXAMPLE 21

Preparation of methyl 4-cyano-11,17α-dimethoxy-18β-hydroxy-3-oxo-3-secoalloyohimbane-16β-carboxylate To a solution of 0.914 g. of methyl 4-cyano-3α,18β-dihydroxy-11,17α-dimethoxy-3-secoalloyohimbane-16β-carboxylate in 25 ml. of glacial acetic acid was added 0.887 g. of lead tetraacetate. The mixture was stirred for 25 minutes and was poured onto ice. The solution was neutralized with 10N sodium hydroxide and extracted with chloroform. The extracts were dried over magnesium sulfate and the solvent was removed under reduced pressure to give a glass. The glass was dissolved in methanol and the solution was concentrated to give crystals. Chilling and filtering gave 0.30 g. of pale yellow crystals, m.p. 275°–277° C. (dec.). The crystals were dissolved in chloroform-methanol (3:2) and the solution was concentrated to 15 ml. Dilution with 5 ml. of methanol, chilling and filtering gave 0.23 g. of methyl 4-cyano-11,17α-dimethoxy-18β-hydroxy-3-oxo-3-secoalloyohimbane-16β-carboxylate as off-white needles, m.p. 291°–292° C. (dec.).

EXAMPLE 22

Preparation of methyl 4-cyano-3β-ethoxy-17α-hydroxy-3-secoalloyohimbane-16β-carboxylate To a chilled mixture of 5.91 g. of α-yohimbine in 50 ml. of ethanol and 50 ml. of chloroform was added 0.79 g. of cyanogen bromide. The solution was allowed to warm to room temperature and was stirred for 16 hours. The precipitate was removed by filtration and washed with chloroform and the filtrate was concentrated in vacuo to a yellow glass. The glass was triturated with acetone and the acetone solution was concentrated under reduced pressure. The resulting glass was triturated with ether and filtered to give 3.00 g. of yellow crystals, m.p. 195°–198° C. Chromatography over silica gel with chloroform-methanol (95:5) (200 ml. cuts) gave product in fractions three and four. Crystallization from ether gave 2.35 g. of methyl 4-cyano-3β-ethoxy-17α-hydroxy-3-secoalloyohimbane-16α-carboxylate as off white crystals, m.p. 209°–211° C.

We claim:

1. A compound selected from the group consisting of those of the formula:

[Structural formula showing indole-containing ring system with N-CN group, positions 3, 4, 15, 16, 20, with H, Z, and $R_4$ substituents, and C=O]

wherein C=Z is selected from the group consisting of $$C=O, \quad C\begin{smallmatrix}OR\\H\end{smallmatrix} \quad \text{and} \quad C\begin{smallmatrix}H\\OR\end{smallmatrix}$$

R is selected from the group consisting of hydrogen and lower alkyl; and $R_4$ is selected from the group consisting of hydrogen and carbomethoxy.

2. A compound according to claim 1 wherein C=Z is $$C\begin{smallmatrix}OH\\H\end{smallmatrix}$$

$R_4$ is hydrogen, and the hydrogen at the 20-position has the β-configuration.

3. A compound according to claim 1 wherein C=Z is C=O, $R_4$ is hydrogen, and the hydrogen at the 20-position has the β-configuration.

4. A compound according to claim 1 wherein C=Z is $$C\begin{smallmatrix}OC_2H_5\\H\end{smallmatrix}$$

$R_4$ is α-carbomethoxy, and the hydrogen at the 20-position has the β-configuration.

5. A compound according to claim 1 wherein C=Z is $$C\begin{smallmatrix}OC_4H_9-n\\H\end{smallmatrix}$$

, $R_4$ is hydrogen, and the hydrogen at the 20-position has the β-configuration.

6. A compound according to claim 1 wherein C=Z is $$C\begin{smallmatrix}OC_2H_5\\H\end{smallmatrix}$$

, $R_4$ is hydrogen, and the hydrogen at the 20-position has the β-configuration.

7. A compound according to claim 1 wherein C=Z is $$C\begin{smallmatrix}OH\\H\end{smallmatrix}$$

$R_4$ is β-carbomethoxy, and the hydrogen at the 20-position has the α-configuration.

8. A compound according to claim 1 wherein C=Z is $$C\begin{smallmatrix}H\\OH\end{smallmatrix}$$

$R_4$ is β-carbomethoxy, and the hydrogen at the 20-position has the α-configuration.

9. A compound according to claim 1 wherein C=Z is $$C\begin{smallmatrix}OC_2H_5\\H\end{smallmatrix}$$

, $R_4$ is β-carbomethoxy, and the hydrogen at the 20-position has the α-configuration.

* * * * *

UNITED STATES PATENT OFFICE
CERTIFICATE OF CORRECTION

Patent No. 3,673,214        Dated June 27, 1972

Inventor(s) Jay Donald Albright and Leon Goldman

It is certified that error appears in the above-identified patent and that said Letters Patent are hereby corrected as shown below:

Column 1, line 55 "OR" should be -- OH --.
Column 2, line 74 "62" should be -- β --.
Column 4, line 75 "of" should be -- if --.
Column 7, line 70 "β" should be -- α --.
Column 12, line 9 "C" should be -- C= --.

Signed and sealed this 23rd day of January 1973.

(SEAL)
Attest:

EDWARD M. FLETCHER, JR.              ROBERT GOTTSCHALK
Attesting Officer                    Commissioner of Patents